United States Patent

[11] 3,579,967

[72] Inventor Gustav Schumacher
 Eichelhardt, Haus Nr. 51, Germany
[21] Appl. No. 858,479
[22] Filed Sept. 16, 1969
[45] Patented May 25, 1971
[32] Priority Sept. 18, 1968, Sept. 18, 1968, Aug. 12, 1969
[33] Germany
[31] P 17 82 561.5, P 17 82 562.6 and P 19 40 955.3

[54] GRAIN-LIFTER FOR GRAIN-CUTTING ASSEMBLIES
 8 Claims, 10 Drawing Figs.
[52] U.S. Cl. .................................................. 56/313
[51] Int. Cl. ................................................ A01d 55/13
[50] Field of Search ............................................ 56/312, 313, 314, 318, 319, 320

[56] References Cited
 UNITED STATES PATENTS
 737,028  8/1903  Seidl ............................. 56/313
 2,214,965  9/1940  Love ............................. 56/313
 2,707,365  5/1955  Dreher .......................... 56/312

Primary Examiner—Russell R. Kinsey
Attorney—Steinberg and Blake

ABSTRACT: A grain lifter for a grain-cutting assembly of the type used, for example, in a harvester thresher and grain binder. A holder is engaged by a finger which is fastened thereto by a bolt and nut. This nut is formed with an annular groove, and a grain lifter has a springy supporting arm formed at its rear end with a notch which receives the part of the nut which is surrounded by the groove thereof with portions of the supporting arm on opposite sides of the notch thereof being received in said groove. This springy supporting arm of the grain lifter has a hook unit fixed thereto, and this hook unit extends around the finger and is pressed against the same by the springy action of the supporting arm when the rear end thereof is in the groove of the finger-fixing nut. The hook unit carries a blocking device which prevents automatic removal or unhooking of the hooking unit from the finger as a result, for example, of up-and-down movement of the springy supporting arm due to engagement of ground irregularities.

FIG.1

PATENTED MAY 25 1971 3,579,967

INVENTOR.
GUSTAV SCHUMACHER
BY Steinberg & Blake
attys

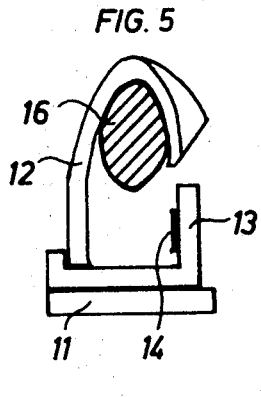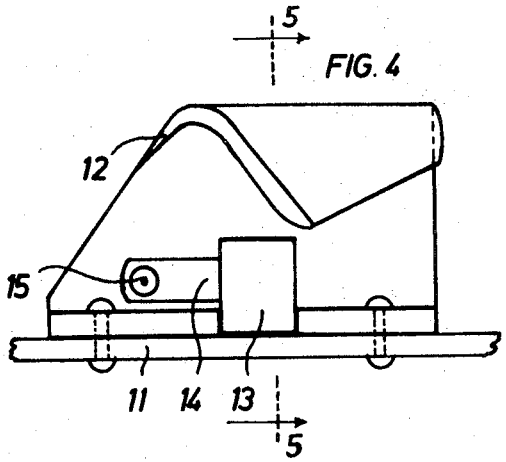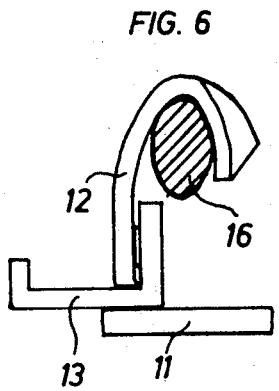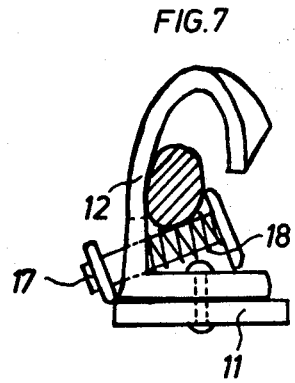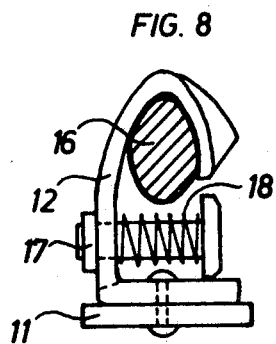

PATENTED MAY 25 1971 3,579,967

INVENTOR.
GUSTAV SCHUMACHER
BY Steinberg & Blake
attys

GRAIN-LIFTER FOR GRAIN-CUTTING ASSEMBLIES

BACKGROUND OF THE INVENTION

The present invention relates to grain-cutting machines.

Such machines may take the form, for example, of a tractor attachment or they may form part of a harvester thresher and grain binder.

The present invention relates particularly to a grain lifter which is used with assemblies of this latter type. Such grain lifters serve to raise from the ground grain which otherwise would not be properly cut. The grain is conventionally guided between fingers which are moved forwardly during movement of the grain-cutting device so as to reach cutters which are situated in the vicinity of the rear ends of these fingers. Grain which happens to be lying directly on the ground, however, will not be properly guided between the fingers to the cutters so that such grain is not properly treated and instead the grain becomes easily separated from the stalk and is lost under such conditions. However, when a grain lifter is used those grain ears which happen to be down on the ground for any reason are lifted so as to be properly handled by the cutting assembly. Thus, such grain lifters serve to raise from the ground grain which no longer stands at the stalk and instead has for some reason become lowered and lies on the ground.

Such grain lifters conventionally are of a pointed configuration and have a relatively flat supporting arm which is to be fastened to one of the fingers so as to extend forwardly therefrom and slide along the ground. This supporting arm is fixed at its front end to an upwardly and rearwardly inclined lifting arm which forms with the supporting arm the pointed tip at the front end of the lifter. This lifting arm generally is of a tubular structure having either an oval or circular cross section and serves to raise the grain which happens to be lying on the ground.

The manner in which such a grain lifter is fixed at its supporting arm to the cutting structure, or in other words to a forwardly extending finger thereof, forms the particular subject of the present invention.

It is already known to provide the rear end of the springy carrying arm of a grain lifter with a notch so that this rear end can be received in a cooperating device at the screw which fixes the finger to a holder of the assembly with the springy supporting arm being stressed so that a hook unit provided with a blocking mechanism may be held in a position extending around the finger with the rear end of the supporting arm fixed to the part which receives the notched rear end thereof. This part which receives the notched rear end of the supporting arm of the grain lifter is in the form of a spool-shaped roller which is held on the finger-fixing screw by a nut which is threaded onto the latter. Because of the thickness of this spool-shaped roller it is necessary to use, instead of a conventional finger-fixing screw, a special screw which has a longer shank. As a result the structure is rendered more expensive, and in addition a longer time is required for assembling the components.

Furthermore, with conventional devices of this type, when the springy supporting of the grain lifter engages ground irregularities it moves up and down, so that an automatic unhooking of the lifter from the finger can take place. In order to prevent this it has already been proposed to provide a blocking device to limit the extent to which the springy supporting arm of the grain lifter can move upwardly toward the finger which is engaged by the hook unit. The known conventional blocking mechanism takes the form of an angle member which is tilted forwardly to a condition freeing the hook unit for movement onto and off from the finger. This blocking member is tilted rearwardly into a blocking position where it limits movement of the hook unit with respect to the finger so as to prevent automatic unhooking due to lifting of the supporting arm by ground irregularities, for example.

However, practical experience has demonstrated that during rearward movement of the harvester thresher the blocking device will now and then be automatically tilted forwardly to its release position as the result of engagement with stubble, so that the blocking function is automatically terminated in an unforeseen manner resulting quiet often in unhooking of the lifter from the finger.

SUMMARY OF THE INVENTION

It is a primary object of the present invention to provide a structure which will avoid the above drawbacks.

Thus, one of the objects of the invention is to provide a structure which does not require a particularly long special screw to accommodate a device for receiving the notched rear end of the supporting arm of the grain lifter as well as a fixing nut.

Furthermore, it is an object of the invention to provide for a structure of the above type a blocking mechanism which will reliably maintain the hook unit in its proper relationship with respect to the finger while at the same time making it extremely convenient for the operator to hook and unhook the hooking unit from the finger whenever desired.

In addition, it is an object of the invention to provide a structure of this type which is exceedingly simple and rugged and which at the same time can be very conveniently and easily manipulated for assembly and disassembly purposes.

In accordance with the invention, instead of providing a separate nut for fixing the spool-shaped roller onto the finger-fixing screw, this spool-shaped roller is itself internally threaded to form a nut. In this way an additional nut is not required and the function of the spool-shaped roller as well as the fixing nut are both performed by the spool-shaped roller itself. Thus, the grooved nut which receives the notched rear end of the supporting arm of the grain lifter acts at the same time as the nut which coacts with the screw for fixing the finger of the cutting assembly to the holder thereof.

While it is not essential to provide any special fixing of the spool-shaped nut on the shank of the screw because the springy supporting arm of the grain lifter will act resiliently on the nut due to the stressing of this springy arm, nevertheless in order to provide a double security it is preferred to provide the nut at the part thereof which is surrounded by the annular groove with a noncircular cross section which forms a square or hexagon, for example. The notched end of the supporting arm engages this part of the nut in a manner similar to a socket wrench with straight opposed side edges which define the notch extending along and located closely adjacent to opposed flat sides of the part of the nut which is surrounded by the groove. In this way any turning of the nut is reliably prevented.

The blocking means of the invention is carried by a sidewall of the hook unit and may, in one embodiment, take the form of an elongated pin having a round head and surrounded by a spring which urges the pin to a position extending beneath the finger so as to limit upward movement of the supporting arm with respect to the finger and thus maintain the hook unit engaged with the finger. However, this pin can be pressed in opposition to the spring to a location providing for unhindered placing of the hook unit onto or removal thereof from the finger.

With a structure of this type the possible movement of the hook unit and supporting arm of the grain lifter with respect to the finger is very limited. In order to provide a certain amount of freedom of movement while retaining the hook unit securely on the finger, the opening through which the pin extends is in the form of an elongated slot so that the pin can move along the slot to provide a degree of freedom of movement to permit the supporting arm to easily yield when engaging irregularities on the ground.

The exterior side surface of the sidewall of the hook unit is somewhat inclined and this feature together with the force of the spring acts to automatically return the blocking pin to its initial blocking position as soon as the supporting arm moves beyond the ground irregularity.

However, an even greater freedom of movement of the supporting arm with respect to the finger can be achieved while still retaining the security of the engagement of the hook unit on the finger by utilizing a second embodiment of a blocking device of the invention. The second embodiment is in the form of a substantially rigid strip of substantially U-shaped cross section having a pair of legs between which the sidewall of the hook unit is located with the sidewall being formed with an opening through which a connecting part of the strip, interconnecting the legs thereof, slidably extends for free movement therethrough. A spring is provided to urge the leg of the strip which is on the same side of the sidewall of the hook unit as the finger to a position which will space it from the sidewall of the unit and thus achieve the desired blocking action. This spring preferably takes the form of a leaf spring. When the leg of the U-shaped blocking strip which is acted upon by this spring is pushed in opposition to the spring to the sidewall of the hook unit, this unit can easily be placed on or removed from the finger.

Because this U-shaped blocking member is shiftable in an opening of the hook unit, an unusually large degree of freedom of movement of the grain lifter with respect to the finger is provided in a vertical direction while at the same time the reliability of the connection between the hook unit and the finger is maintained. As a result it is possible for the supporting arm to yield to a large degree when engaging irregularities in a manner which is not possible with known constructions.

By providing the above leaf spring which acts on the blocking strip with a configuration at one end of an angled holding element, it is possible to fix the leaf spring directly to the sidewall of the hook unit and thus eliminate the requirement of a special fastening structure for the leaf spring.

It is, however, also possible according to the invention to provide a spring in the form of a chassis clamp arranged at the hook unit in such a way that it acts on the leg of the U-shaped blocking member which is on the side of the sidewall of the hook unit opposite from the finger in order to press this latter leg inwardly toward the sidewall and thus maintain the blocking strip in its blocking position preventing removal of the hook unit from the finger.

BRIEF DESCRIPTION OF DRAWINGS

The invention is illustrated by way of example in the accompanying drawings which form part of this application and in which:

FIG. 4 is a fragmentary side elevation showing a hook unit fixed to the supporting arm together with one embodiment of a blocking means;

FIG. 5 is a partly sectional transverse elevational structure of FIG. 4 taken along line 5–5 of FIG. 4;

FIG. 6 shows the structure of FIG. 5 in its nonblocking position;

FIG. 7 shows another embodiment of a blocking means of the invention, FIG. 7 illustrating how the blocking means prevents removal of the hook unit from the finger;

FIG. 8 shows the structure of FIG. 7 returned to its normal position;

DESCRIPTION OF PREFERRED EMBODIMENTS

Figure 1:
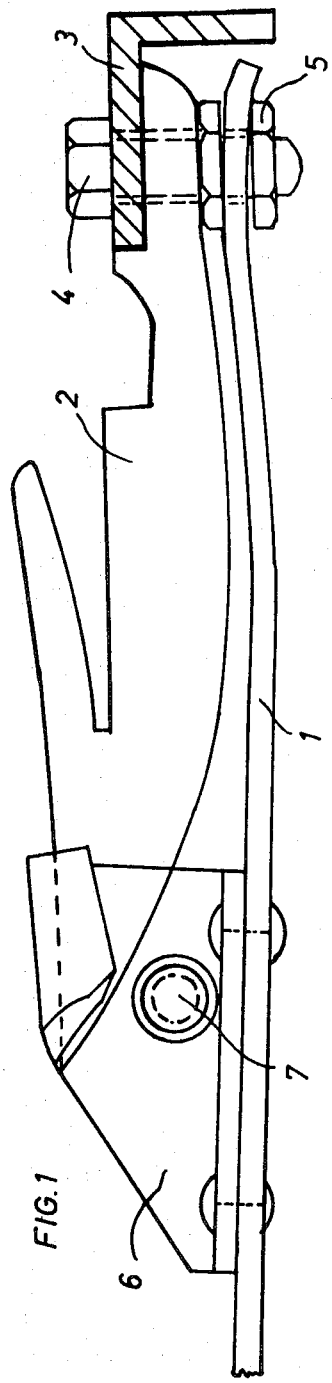
FIG. 1 illustrates an embodiment of the invention where the spool-shaped roller also acts as a nut.
Figure 2:
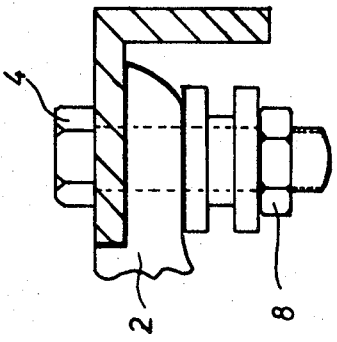
FIG. 2 shows the structure at the right of FIG. 1 with the nut separated from the fixing screw.
Figure 3:
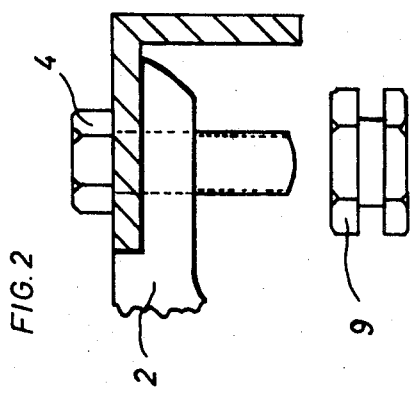
FIG. 3 illustrates a prior art arrangement.

Referring now to FIG. 1, only the springy supporting arm 1 of a grain lifter is fragmentarily illustrated therein for the sake of clearly illustrating at a fairly large scale that part of the cutting assembly where the structure of the present invention is located. Thus, for the sake of clarity the forward pointed tip of the grain lifter is not shown in FIG. 1. The holder 3 of the assembly is engaged by a finger 2 which is fastened to the holder 3 by way of a screw 4 which extends through aligned openings of the holder 3 and the finger 2 and which receives a fixing nut 5 which is annularly grooved so that it has the configuration of a spool-shaped roller. Thus, this unit 5 functions on the one hand as a spool-shaped roller, and on the other hand as a nut which coacts with the screw 4 to fix the finger 2 to the holder 3. The rear end of the springy support arm 1 which is shown at the right in FIG. 1 is notched so that it can be received in the groove of the nut 5. The element 9 which is shown in FIG. 2 separated from the screw 4 corresponds to the nut 5 of FIG. 1. This structure can be contrasted with that of FIG. 3. The FIG. 3 structure is the conventional structure where the nut 8 serves together with the screw 4 not only to fix the finger 2 to the holder but also to fix the spool-shaped roller on the screw 4 beneath the finger 2. Therefore this screw 4 must be of a particularly long length and of course additional undesired time is required to assemble components. However, by replacing these components of FIG. 3 with a single nut such as the nut 5 of FIG. 1 or the nut 9 of FIG. 2, with this nut formed with an annular groove, the nut can act as a fixing nut and at the same time can perform the function of the spool-shaped roller. Thus the notched end of the arm 1 will be received in the groove of the nut, and it is preferred to provide the part of the nut which is surrounded by the groove thereof with a noncircular cross section which may be square or hexagonal, for example, so that with straight sides of the notch extending along opposed flat sides of the nut in the groove thereof, relative turning between the nut and the springy arm 1 is prevented.

The arm 1 has riveted or otherwise fixed thereto a hook unit 6 which extends around and hooks onto the finger 2. Because of the stressing of the springy arm 1 in the groove of the nut 5 the arm 1 urges the hook unit 6 downwardly against the finger 2. Beneath the finger 2 the unit 6 carries a blocking device 7 described in greater detail below and serving to prevent removal of the hook unit 6 from the finger 2 while at the same time providing a certain degree of freedom of vertical movement of the arm 1 when it engages ground irregularities.

Referring now to FIGS. 4—6, the fragmentarily illustrated supporting arm 11 of the grain lifter is shown as fixed, for example by riveting, with a hook unit 12 which, when used, extends around the finger of the cutting assembly. In order to prevent an automatic unhooking of the hook unit 12 from the finger 16, shown in section in FIGS. 5 and 6, during operation of the assembly, a blocking means is provided. This blocking means includes a substantially rigid strip 13 made of metal, for example, and having the U-shaped configuration which is clearly apparent in FIGS. 5 and 6. Thus it will be seen that this blocking strip 13 has a pair of opposed upstanding legs interconnected by a horizontal connecting portion which is capable of shifting freely through an opening formed in the lower region of the hook unit 12, particularly through the bottom of the upstanding sidewall thereof which is shown at the left in FIGS. 5 and 6. The longer leg which is shown at the right in FIGS. 5 and 6 forms the blocking leg and assumes the blocking position shown in FIG. 5 under the influence of a spring means which preferably is in the form of a leaf spring 14. Thus, the sidewall of the hook unit 12 extends between the legs of the U-shaped blocking strip 13 and that leg thereof which is on the same side of the sidewall as the finger 16 is the blocking leg urged by the spring means 14 to the blocking position shown in FIG. 5. It is apparent that with the parts in the position of FIG. 5 while there is a considerable freedom of movement of the arm 11 up and down with respect to the finger 16, as when the arm 11 engages ground irregularities, nevertheless the hook unit 12 cannot become unhooked from the finger 16 due to the small clearance between the right edge of the hook unit 12 and the top edge of the right leg of the strip 13.

However, whenever desired the operator can push the strip 13 in opposition to the spring 14 to the position shown in FIG. 6, and in this position it is a simple matter to quickly hook or unhook the unit 12 as desired.

Instead of providing a separate component for mounting the spring 14 on the unit 12, it is preferred to provide the spring 14 at its left end, as viewed in FIG. 4, with an angled configuration so that a rivet 15, for example, can extend directly through this fastening end of the spring 14 and a suitable opening formed in the sidewall of the hook unit 12, so as to enable the leaf spring 14 in this way to be fixed directly with the hook unit 12. Thus, the spring means 14 normally acts to maintain the blocking means 13 in its blocking position shown in FIGS. 4 and 5.

The embodiment of the invention which is shown in FIGS. 7 and 8 has a different blocking means. In this embodiment the blocking means includes an elongated blocking pin 17 extending through an opening in the sidewall of the hook unit 12 and terminating at its right end, as viewed in FIGS. 7 and 8, in a circular head. To the left of the unit 12 the pin 17 carries a snapring or the slide to prevent the pin 17 from moving through the opening of the sidewall of the unit 12 to the right, as viewed in FIGS. 7 and 8. A coil spring 18 surrounds the pin 17 and engages the sidewall of the unit 12 as well as the round head at the right end of the pin 17 to yieldably hold the pin 17 in the position shown in FIG. 8, which illustrates the blocking position of the pin 17. As is apparent from FIG. 8 there is only a limited degree of vertical movement possible for the arm 11 before the pin 17 engages the finger 16, and the hook unit 12 will be securely maintained on the finger 16.

However, it is desirable to provide a larger degree of freedom of movement for the arm 11 when the latter engages irregularities on the ground, and in order to achieve this result, instead of directing the pin 17 through a simple circular opening whose diameter is only slightly larger than the diameter of the pin 17, it is preferred to provide the wall 12 with an elongated vertically extending slot enabling the pin 17 to tilt downwardly from the position shown in FIG. 8 to the position shown in FIG. 7. In this way when the arm 11 engages any ground irregularity, it is possible for the arm 11 to move up to the position shown in FIG. 7 while the blocking pin 17 is tilted by the finger 16 while at the same time the security of the connection between the hook unit 12 and the finger 16 is maintained.

On the other hand, the operator can at any time push the head at the right end of the pin 17 to the left as viewed in FIG. 8, so as to situate the head beneath and to the left of the finger 16, while at the same time the security of the connection between the hook unit 12 and the finger 16 is maintained.

On the other hand, the operator can at any time push the head at the right end of the pin 17 to the left, as viewed in FIG. 8, so as to situate the head beneath and to the left of the finger 16, at the position occupied by the right leg of the strip 13 in FIG. 6, and now it is a simple matter for the operator to unhook the unit 12, or to place the unit 12 on the pin 16. Upon release of the pin 17 the spring 18 will expand to return the pin to the position shown in fig. 8. Also when the arm 11 returns down to its normal elevation to the top part of the hook unit 12 will engage the top of the finger 16 and the spring 18 will expand to return the pin 17 automatically to its position shown in FIG. 8 from the position shown in FIG. 7. In this connection it is to be noted that the exterior side surface of the sidewall of the unit 12 is inclined so that through this inclination there is also a contribution to the automatic return of the pin 17 by the spring 18 of the position shown in FIG. 8.

Figure 9:
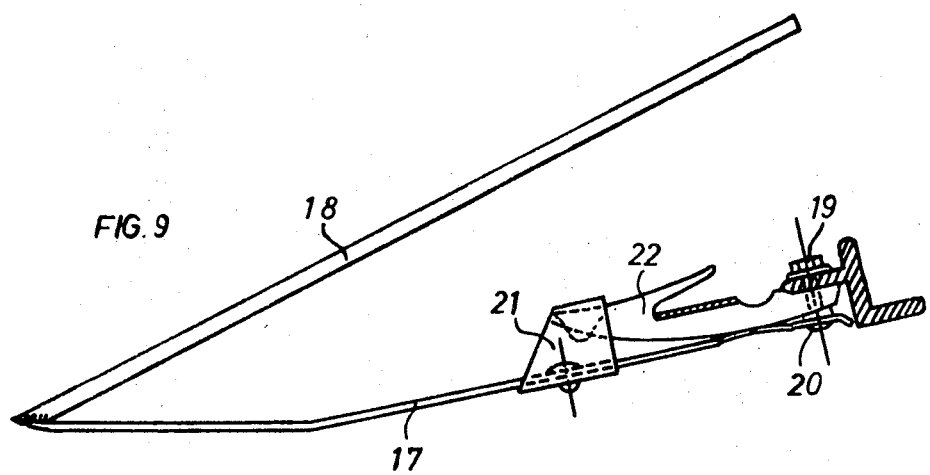
FIG. 9 is an illustration of an entire grain lifter mounted on a finger which is fastened to a holder of the cutting assembly.

FIG. 9 illustrates the grain lifter which has the springy carrying or supporting arm 17 corresponding to the arms 1 and 11 referred to above. This springy supporting arm 17 is fixed at its front end of the upwardly and rearwardly inclined lifting arm 18 so that these arms form the pointed front tip of the grain lifter 17, 18. The notched rear end 20 of the arm 17 is shown connected operatively with the fastening screw 19 which fastens the finger 22 to the holder of the cutting assembly. The hook unit 21 which is fixed to the arm 17 extends around the finger 22 in the manner illustrated in FIG. 9.

Figure 10:
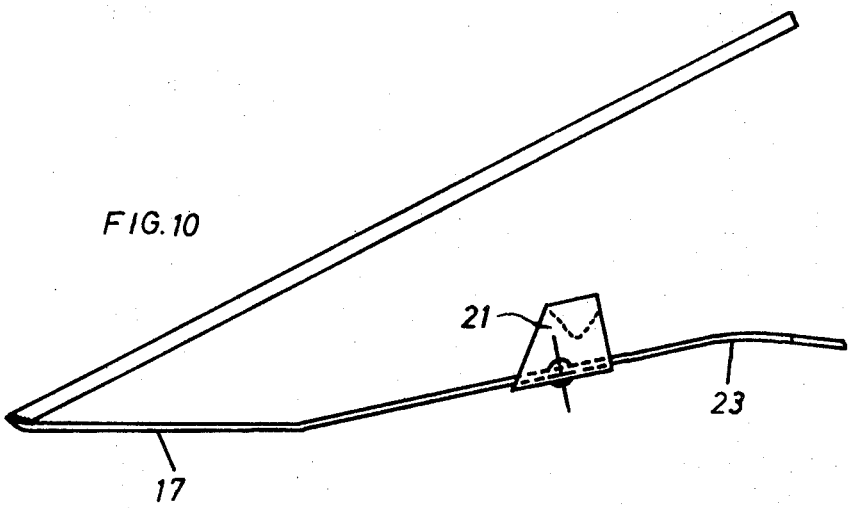
FIG. 10 shows the grain lifter by itself to illustrate the configuration which the springy supporting arm takes when it is not stressed.

FIG. 10 shows the grain lifter of FIG. 9 by itself before it is assembled with the finger 22 and connected with the screw 19. It is to be noted particularly from FIG. 10 that the arm 17 has a curvature at its portion 23 different from that shown in FIG. 9. The reason for this is that the connection of the rear end 20 of the arm 17 to the screw 19 deflects and stresses the springy portion 23 to tend to urge the arm 17 downwardly, and it is this resilient force derived from the springy arm 17 which urges the hook unit 21 down against the top of the finger 22.

I claim:

1. In a grain-cutting assembly, a holder, a finger engaging said holder and extending therefrom, a fastening bolt extending through said holder and finger, a nut threaded on said bolt and engaging said finger for coacting with said bolt to fix said finger to said holder, said nut being formed between its ends with an annular groove providing said nut being formed between it is ends with an annular groove providing said nut with the configuration of a spool, a grain lifter having a springy supporting arm formed at a rear end thereof with a notch which receives that part of said nut which is surrounded by said groove with said rear end portion of said springy supporting arm received in said groove of said nut, a hook unit fixed to said supporting arm and extending therefrom around said finger, said springy arm when in said groove of said nut coacting therewith for resiliently urging said hook unit into engagement with said finger, and blocking means carried by said hook unit for preventing unhooking thereof from said finger during up-and-down movement of said springy supporting arm when engaging ground irregularities.

2. The combination of claim 1 and wherein the part of said nut which is surrounded by said groove is of a noncircular cross section and has opposed flat sides situated closely adjacent opposed straight edges which define part of said notch of said arm so that the latter cannot turn with respect to said nut.

3. The combination of claim 1 and wherein said blocking means includes a sidewall portion of said hook unit formed with an opening passing therethrough, a pin extending through said opening beneath said finer and terminating in a round head, and a spring surrounding said pin and engaging said sidewall of said hook unit and said head of said pin for yieldably maintaining the latter in a blocking position beneath said finger to prevent automatic unhooking of said unit from said finger, while said pin may be pressed in opposition to said spring to a position permitting manual hooking and unhooking of said unit onto and off from said finger.

4. The combination of claim 3 and wherein said opening in said sidewall of said hook unit is of an elongated configuration extending substantially perpendicularly with respect to said supporting arm and finger to provide for lateral, tilting, up-and-down movement of said pin.

5. The combination of claim 1 and wherein said blocking means includes a substantially rigid strip of substantially U-shaped configuration having a pair of opposed upstanding legs and a connecting portion extending therebetween, said hook unit having a sidewall formed with an opening through which said connecting portion extends so that said legs are respectively situated on opposite sides of said sidewall of said hook unit, and a spring acting on one of said legs for yieldably holding said strip in a blocking position while the latter may be shifted in opposition to said spring to an unblocking position.

6. The combination of claim 5 and wherein said spring is a leaf spring acting on that leg which is at the same side of said sidewall as said finger.

7. The combination of claim 6 and wherein said leaf spring is fixed at one end of said sidewall of said hook unit and at its other end presses against that leg which is on the same side of said sidewall as said finger.

8. The combination of said claim 5 and wherein said spring is in the form of a chassis clamp acting on that one of said legs which is on the side of said sidewall of said hook unit which is opposite from said finger.